United States Patent [19]

Shaw et al.

[11] Patent Number: 4,863,699
[45] Date of Patent: Sep. 5, 1989

[54] GRID WITH CONICAL SUPPORT SKIRT

[76] Inventors: Donald J. Shaw, Magnolia Ave., Denville, N.J. 07834; Te-Hung Chen, Shetland Rd., Florham Park, N.J. 07932

[21] Appl. No.: 152,804

[22] Filed: Feb. 5, 1988

[51] Int. Cl.⁴ .............................................. B01J 8/44
[52] U.S. Cl. .................................. 422/143; 422/221; 422/311
[58] Field of Search ...................... 422/143, 221, 311

[56] References Cited

U.S. PATENT DOCUMENTS

| | | | |
|---|---|---|---|
| 2,595,384 | 5/1952 | Johnsen et al. | 422/143 |
| 2,651,565 | 9/1953 | Bergman | 422/143 |
| 2,690,962 | 10/1954 | Clarke | 422/143 |
| 2,836,902 | 6/1958 | North | 422/143 |
| 2,934,411 | 4/1960 | Purse | 422/143 |
| 4,292,023 | 9/1981 | DeFeo et al. | 422/143 |
| 4,359,326 | 11/1982 | Hoffert et al. | 422/143 |

Primary Examiner—Benoit Castel

[57] ABSTRACT

In brief, a grid plate, especially a flat grid plate, horizontally disposed in a fluidized solids contacting vessel, is supported by a conical skirt that extends downwardly and inwardly from substantially the outer periphery of the grid plate for a predetermined portion of the length of the skirt and then downwardly to the bottom of the vessel. Preferably, the conical skirt extends inwardly at an angle, α, measured from the vertical in the range of about 20 degrees to about 45 degrees, and preferably about 30 degrees, for a distance equal to about one third to one half of the length of the skirt, and generally for a distance of about half the length of the skirt.

4 Claims, 2 Drawing Sheets

GRID WITH CONICAL SUPPORT SKIRT

FIELD OF THE INVENTION

This invention relates to an improved grid support for a fluidized solids contacting apparatus. More particularly, the present invention is concerned with supporting a grid in a fluidized solids contacting apparatus in such a way that the pressure load of the grid is more effectively transmitted through the support structure to the vessel, thereby reducing cracking at the junction between the grid and its support structure and which also accommodates the thermal gradient that exists between the grid and the vessel shell. Thus, the present invention is particularly applicable to vessels wherein finely divided solids, either catalytic or non-catalytic, are fluidized and treated or reacted with liquid or gaseous fluids at elevated temperatures, for example, temperatures of about 1350° F. Indeed, the present invention is especially applicable to catalyst regenerators in fluid catalytic cracking systems

BACKGROUND OF THE INVENTION

As is known in the art, there are various ways for supporting the grid plate in fluidized solids contacting systems For example, in the catalyst regenerator described in U.S. Pat. No. 2,595,384, the grid plate is supported by means of a cylindrical skirt which rests on a refractory ledge in the regenerator vessel.

In U.S. Pat. No. 2,836,902 there is disclosed a circular support for suspending a dished grid plate The circular support is welded to the vessel wall at a point above the grid and may be welded or fastened to the grid plate. In this way the grid is supported from above.

In U.S. Pat. No. 4,292,023 there is disclosed a fluidized bed combustor having a gas distributor, supported, at least in part, by means of a conical sidewall.

U.S. Pat. No. 4,359,326 discloses an apparatus in which a grid plate is supported by means of two sets of annular legs, one having a smaller diameter than the other.

As can be seen from the foregoing references, various structures have been employed for supporting grid plates in fluidized solids reactor vessels. Some of these designs were particularly concerned with accommodating the thermal expansion and contraction that exists between the grid plate and the vessel, particularly during cyclic operations. With the ever-increasing temperatures used in fluidized solids contacting processes, the thermal gradients between the grid plates and the vessel shells have become greater, necessitating improvements to address those thermal stresses. Additionally, stresses have been encountered in fluidized solids contacting apparatus as a result of pressure loads between the grid plate and the vessel walls. Thus, there remains a need for improved structure for supporting grid plates, particularly flat grid plates from vessel walls in fluidized solids contacting apparatus.

SUMMARY OF THE INVENTION

In brief, a grid plate, especially a flat grid plate, horizontally disposed in a fluidized solids contacting vessel, is supported by a conical skirt that extends downwardly and inwardly from substantially he outer periphery of the grid plate for a predetermined portion of the length of the skirt and then downwardly to the bottom of the vessel. Preferably, the conical skirt extends inwardly at an angle, $\alpha$, measured from the vertical in the range of about 20 degrees to about 45 degrees, and preferably about 30 degrees, for a distance equal to about one third to one half of the length of the skirt, and generally for a distance of about half the length of the skirt.

Basically, the grid support skirt of the present invention allows for differences in thermal expansion and contraction between the grid and the vessel wall. The support skirt also more efficiently transfers the pressure load between the grid plate and the skirt, thereby reducing potentially damaging stresses to the support structure.

The essential features of the support structure of the present invention are illustrated in the accompanying drawings and explained in the detailed description which follows.

DETAILED DESCRIPTION OF THE INVENTION

Figure 1:
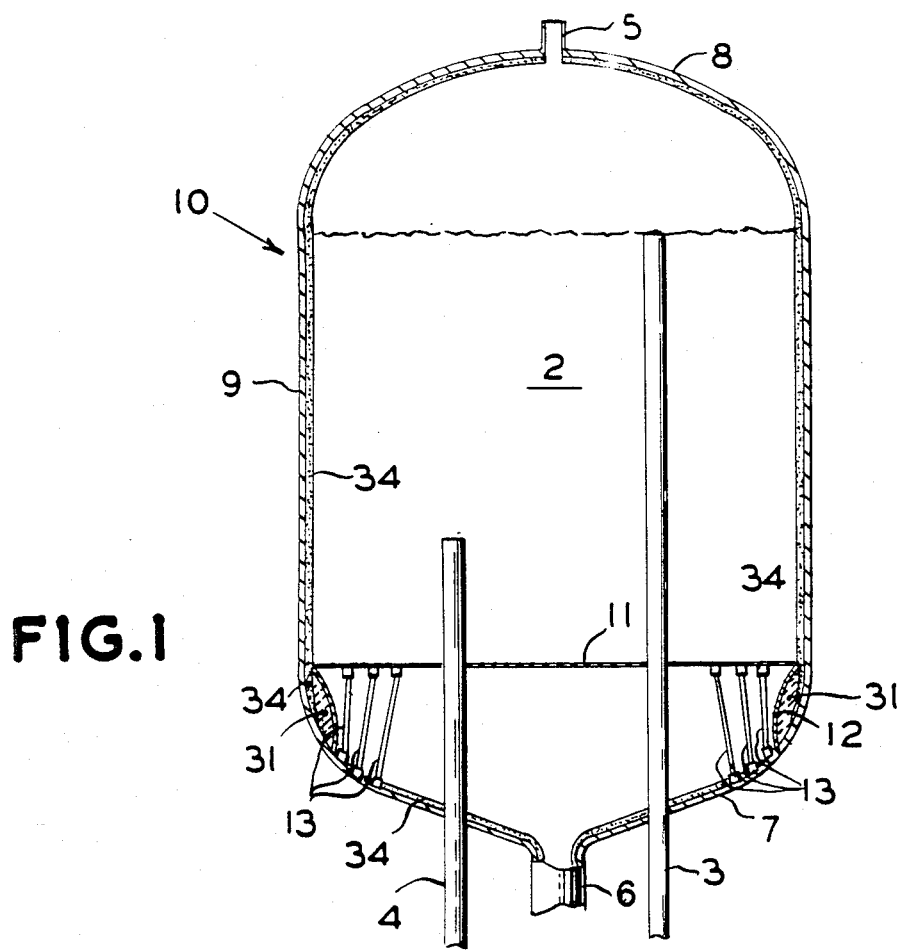
FIG. 1 diagrammatically illustrates a fluid-solids vessel containing the improved conical grid support skirt of the present invention.

Referring now to the drawings, and in particular to FIG. 1, vessel 10 for fluidized solid contacting has generally cylindrical sidewalls 9 with a generally hemispherical top 8 and conical or hemispherical bottom 7. A grid plate 11 is horizontally disposed within vessel 10, and spaced from the vessel sidewalls 9 sufficiently to permit thermal expansion of the grid. The grid, of course, has appropriate perforations therein for adequately distributing a fluidizing gas across the diameter of the reactor vessel.

In the practice of the present invention, it is particularly preferred that the grid plate be flat. However, a convex or concave plate could equally be supported by the unique support structure disclosed and claimed herein.

As is shown in FIG. 1, the reactor vessel 10 is provided with an inlet 6 for introducing a fluidizing gas and an outlet 5 for removal of the gas. Additionally, the reactor is provided with a pipe 4 for the introduction of particulate materials, such as catalyst to be regenerated, in the vessel 10, as well as a downcomer 3 for removal of particulates, i.e. regenerated catalyst. The vessel may be equipped with a cyclone (not shown) and other normal components of such regenerator vessels.

In operation, a bed of fluidized solids 2 is suspended above the grid 11 by fluidizing gas introduced into the vessel via line 6. The fluidized gas, of course, ascends through the grid and exits via line 5.

As can be seen in FIG. 1, the grid plate 11 is supported by a conical skirt 12 which will hereinafter be described in greater detail. Optionally and preferably, columns 13 are provided for additional support of the grid.

Figure 2:
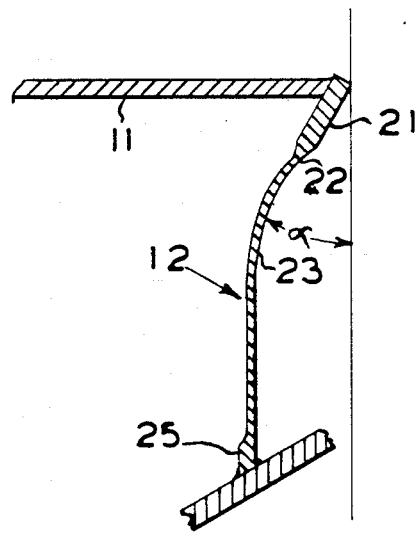
FIG. 2 is a detailed sketch showing the structure of a portion of the skirt of the present invention.

The conical skirt 12 is shown in greater detail in FIG. 2. As shown, a central feature of the conical skirt 12 is that it extends downwardly and inwardly for a distance of about one third to one half of the length of the skirt, and preferably about half the length of the skirt. Then it extends substantially vertically downward to the bottom wall 7 of the vessel. As is shown in FIG. 2, the inward direction of the conical skirt 12 is at an angle, $\alpha$, from the vertical in the range of about 20 degrees to 45 degrees, and preferably at an angle of 30 degrees. The conical skirt 12 is welded, for example, to the outer periphery of the grid plate 11 at its top end, and it is welded to the vessel floor 7 at its lower end. Preferably, the conical skirt is provided with a stub 21 at the top of the skirt which has a tapered transition section 22 between the top stub 21 and the central web 23 of the skirt. Optionally and preferably, a lower thick stub 25 is also provided.

As will be readily appreciated, in fluid catalytic regenerators there are significant temperature differentials between the grid plate and the wall of the vessel. For example, the grid plate may reach temperatures of over 1200° F. whereas the wall of the vessel may reach temperatures in the range of 300° F. to 450° F. It has been found that the conical skirt of the present invention is more effective in accommodating these differential temperature gradients. Additionally, it has been found that by utilizing the conical skirt of the present invention that the pressure load of the grid plate is more efficiently transmitted between the plate and the skirt, thus reducing stresses which have caused cracking at conjunctions between existing flat plates and existing conical skirts.

Figure 3:
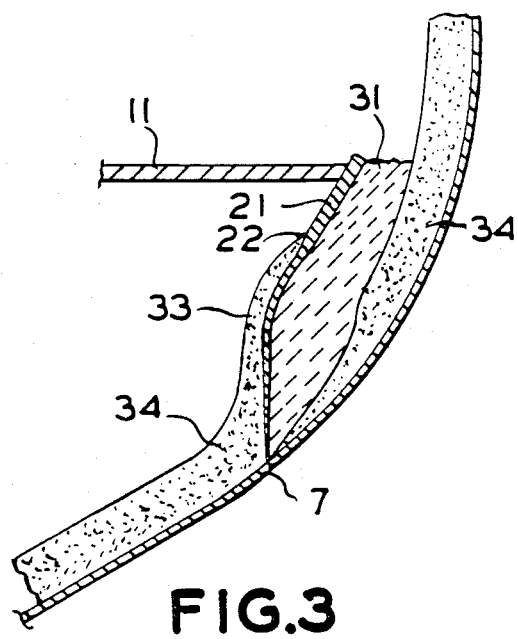
FIG. 3 diagrammatically illustrates the support skirt of the present invention and the preferred placement of refractory lining material relative to the support.

Referring again to FIG. 1 and especially FIG. 3, the vessel 10 is lined with an insulating material 34 such as refractory insulating materials typically employed in such vessels. In the annular space between the conical skirt 12 and the vessel wall is placed a compressible insulating material 31. As shown in FIG. 3, the tapered portion 33 of the insulation lining 34 extends up from the bottom wall 7 so as to cover the inside of the conical skirt 12 for approximately three quarters of its length and preferably up to about the tapered transition section 22 of the skirt 12.

As indicated in connection with FIG. 1, additional columns 13 are used to support the flat grid 11. Attachment of these columns 13 is described in connection with FIGS. 4 to 7.

Figure 4:
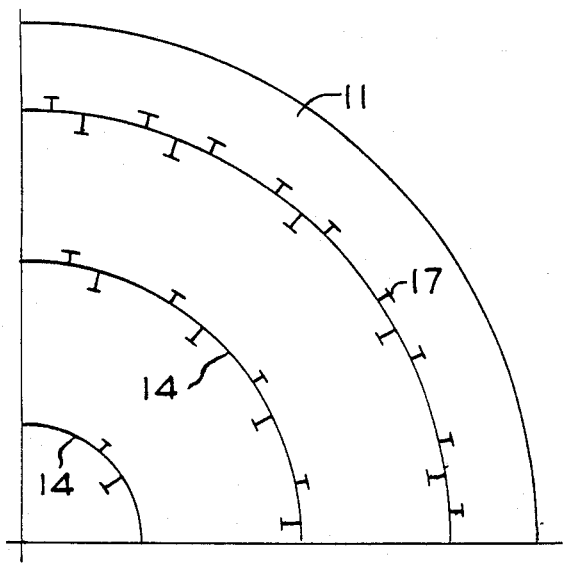
FIGS. 4 and 5 are diagrammatic illustrations of a section of a grid plate showing ring beams and gusset supports for the grid plate.
Figure 5:
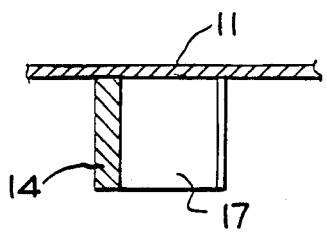

Turning first to FIG. 4, grid plate 11 is provided with three concentric ring beams 14, and, optionally and preferably, have attached thereto the T-shaped gussets 17 shown in FIGS. 4 and 5.

Figure 6:
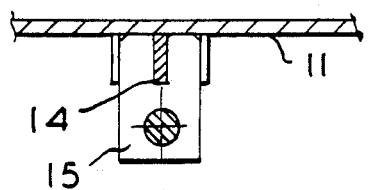
FIGS. 6 and 7 diagrammatically illustrate additional support means for a grid plate.
Figure 6:
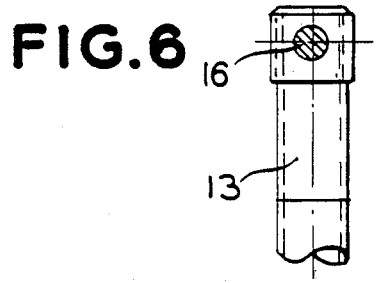
Figure 7:
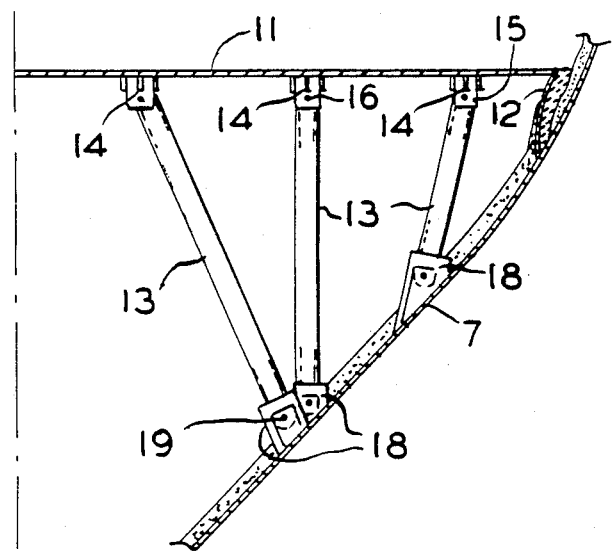

As can be seen in FIG. 6, the columns 13 are connected to the ring beams 14 by clevis 15 and pin 16 and in FIG. 7 it is seen that the mounting bracket 18 is attached to the bottom of the vessel wall 7 for attaching the bottom portion of column 13 via pins 19. Alternate means for attaching the columns 13 to the vessel wall could be applied, such as bolts, welding and the like.

It is, of course, intended that the present invention cover not only the preferred embodiment disclosed hereinabove but is also intended to cover any modifications and variations of the invention to the extent that they come within the scope of the appended claims and their equivalents.

What is claimed is:

1. In a vessel for fluidized solids contacting having a grid plate horizontally disposed therein, the improvement comprising: a conical support skirt for said grid plate, said conical support skirt extending downwardly and inwardly from the outer periphery of said grid plate for a distance of from about one-third to about one-half the length of the skirt, and extending and inwardly at an angle ranging from about 20 degrees to about 40 degrees from the vertical and then vertically downward to the vessel bottom wall.

2. The improvement of claim 1 wherein the angle is 30 degrees.

3. The improvement of claim 2 wherein the distance is about half the length of the skirt.

4. The improvement of claim 3 wherein said skirt has a thickened section at the end of the skirt attached to the grid plate, a central web section and a thickened section at the end of the skirt attached to the vessel bottom.

* * * * *